United States Patent [19]

Dague

[11] Patent Number: 4,930,954
[45] Date of Patent: Jun. 5, 1990

[54] HOLDING DEVICE FOR MILLING MACHINES

[76] Inventor: Elwood D. Dague, 2239 S. Mead, Wichita, Kans. 67211

[21] Appl. No.: 353,481

[22] Filed: May 18, 1989

[51] Int. Cl.$^5$ .............................................. B23C 9/00
[52] U.S. Cl. ..................... 409/136; 33/832; 248/231.8; 408/61; 408/241 R; 409/218
[58] Field of Search ............... 408/61, 56, 16, 241 R; 409/136, 218; 248/231.8, 904; 33/832

[56] References Cited

U.S. PATENT DOCUMENTS 2,235,582  3/1941  Klema ................................ 409/136
4,208,157  6/1980  Guarino et al. ..................... 409/218
4,320,832  3/1982  Edstrom ........................ 248/230 X Primary Examiner—Steven C. Bishop
Attorney, Agent, or Firm—Robert E. Breidenthal

[57] ABSTRACT

A resilient C-shaped clamp subtending an angle substantially more than 180 degrees, such clamp being internally conformable to a cylinder and being of a diameter such as to frictionally grip the quill of a milling machine, and having an entrance of greater width than the diameter of the spindle of the milling machine to facilitate axial alignment with and engagement on the quill. The clamp has a radial extension diametrically opposed to the entrance that is provided with an opening parallel to the cylindrical axis of the clamp for adjustably accepting shanks of accessory items.

4 Claims, 1 Drawing Sheet

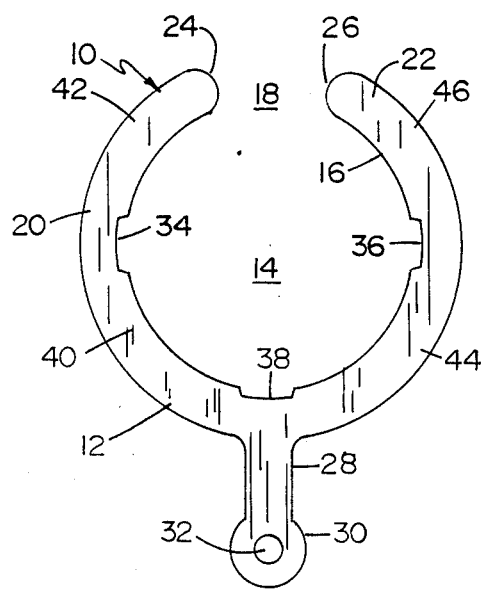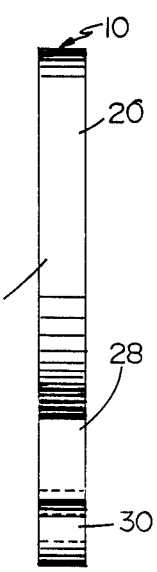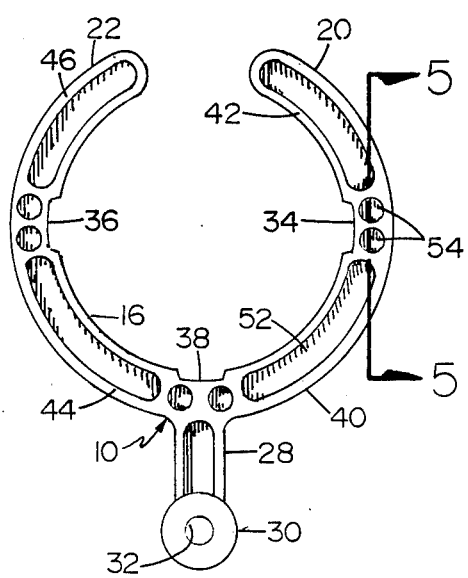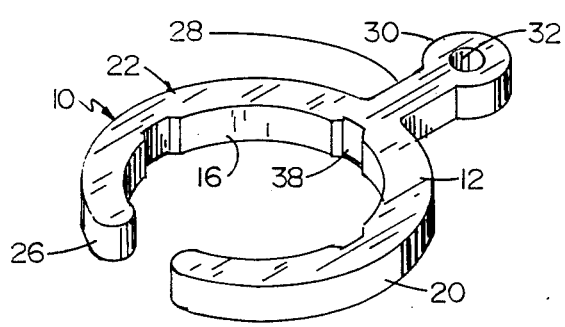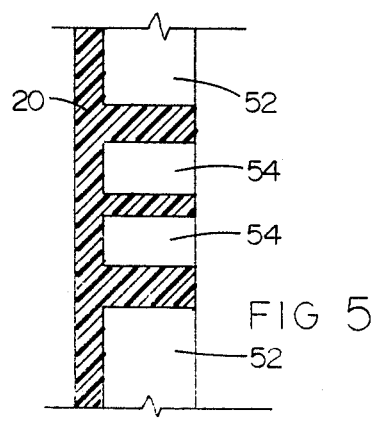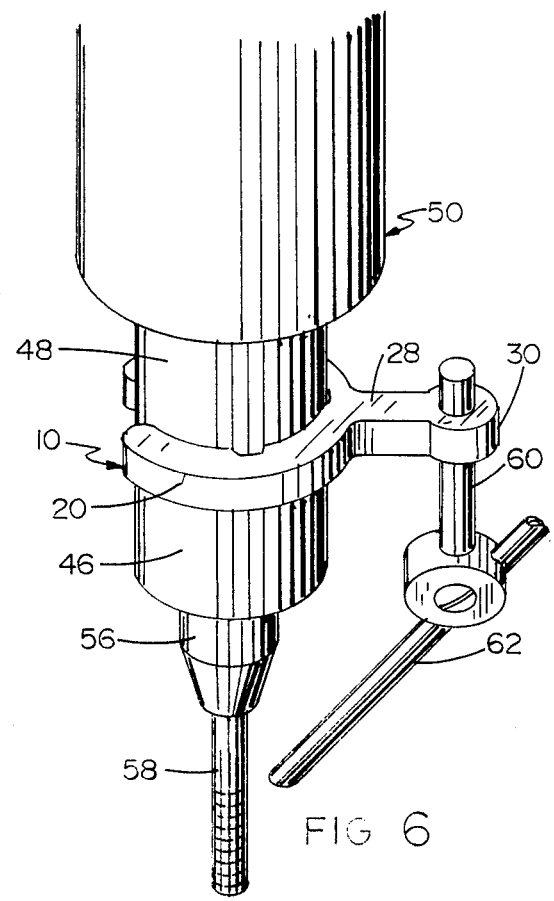

HOLDING DEVICE FOR MILLING MACHINES

BACKGROUND OF THE INVENTION

1. Field of the Invention

The present invention relates to new and useful improvements in accessories for machine tools, and more particularly pertains to devices for holding items in operative relationship to milling machines; especially machines such as Bridgeport type mills.

2. Description of Related Art

Numerous structures employ various forms of mounting clamps.

Exemplary of those deemed of greatest interest to the present invention may be mentioned the following U.S. patents:

U.S. Pat. No. 4,208,157, entitled SNAP-ON INDICATOR HOLDER KIT, which issued to Guarisos et al. on June 17, 1980, discloses a variety of holding devices that may be snapped on the rotatable millhead carried by the quill of a machine tool by means of resilient member having a C-shaped opening that is of slightly more than 180 degree extent.

U.S. Pat. No. 4,320,832, entitled CLIP FOR HOLDING SAFETY RAZOR, which issued to Edstrom on Mar. 23, 1982, discloses a C-shaped holder that may partially embrace a shaving cream container for holding a razor.

U.S. Pat. No. 3,442,478, entitled UNIVERSALLY ADJUSTABLE DIAL INDICATOR HOLDER, which issued to Parapetti on May 6, 1969, discloses a holder that employs a C-shaped clamp that is tightened by a screw for securance to the rotatable spindle of a machine tool.

U.S. Pat. No. 1,285,018, entitled ELECTRIC LIGHT SUPPORT, which issued to Bryant on Nov. 19, 1918, discloses an adjustable lamp holder mounted on the body of a sewing machine by a screw tightened C-clamp.

U.S. Pat. No. 2,571,853, entitled INDICATOR SUPPORT, which issued to Fontecchio on Oct. 16, 1951, discloses an adjustable indicator holder that is secured to a rotatable shank of a lathe by a screw tightened C-clamp.

U.S. Pat. No. 1,806,773, entitled LIGHTING FIXTURE, which issued to Waters on May 26, 1931, discloses a bedpost holder attachment that uses a screw tightened C-clamp to grip the column of a lamp.

U.S. Pat. No. 1,299,832, entitled COVER HOLDER, which issued to Holdsworth on Apr. 8, 1919, discloses a resilient split ring engageable about a reduced neck portion of a jar, such ring being provided with means for supporting a lid for the jar as well as smoking pipes and the like.

U.S. Pat. No. 3,902,931, entitled UNIVERSAL FASTENER AND BRACKET, which issued to Danciger et al. on Sept. 2, 1975, discloses a screw tightened C-clamp, with the screw being adapted to support articles.

U.S. Pat. No. 4,658,813, entitled SUCTION HEAD HOLDER FOR A TRACHEOSTOMY TUBE, which issued to Jones on Apr. 21, 1987, discloses a suction hose connection fixed to a C-shaped for attachment to a tracheostomy tube.

U.S. Pat. No. 4,558,495, entitled HOLDER, ESPECIALLY FOR A DRILL CHUCK KEY, which issued to Olsen on Dec. 17, 1985, discloses a resilient C-shaped ring of slightly more than 180 degrees that can be snapped on the shank of a chuck key, and a tether ring can be seated in an exterior groove in the ring.

SUMMARY OF THE INVENTION

The paramount object of the invention is to provide a holding device that can be readily installed on and removed from the quill of a milling machine, and when installed can be adjusted in position manually as desired, both vertically and angularly about the axis of the quill, and which will functionally retain its adjusted positioned on the quill pending subsequent readjustment.

Another important object in accordance with the preceding object is to provide a holding device that can hold any of a wide variety of items in adjustable positions or attitudes thereon, such as mist sprayers, illuminators, magnifying lenses, etc.

Yet another important objective in accordance with the preceding objects is to provide a holding device that is economical to fabricate, that is durable and reliable in operation, and which does not in itself constitute a hazard to the operator.

Broadly the invention involves an accessory item holder for use with milling machines, said holder comprising a C-shaped body of resilient material defining an opening having an internal wall bounding said opening that is generally conformable to a right circular cylinder, said opening having an entrance of a width that is less than about 70% of the diameter of the opening, said body having an axial thickness of from about 15% to about 30% of the diameter of the opening, and the body having a radial extent about the opening of about 15% to about 35% of the diameter of the opening, and said body having an integral radially extending support arm at a position that is spaced angularly from the entrance, said arm being provided adjacent its extremity with an aperture therethrough that is parallel to the axis of the opening, such aperature being adapted to accept adjustably therethrough the shanks of accessory items.

BRIEF DESCRIPTION OF THE DRAWINGS

Other objects, features and advantages of the invention will become apparent during the ensuing description of a preferred embodiment thereof, such description being given in conjunction with the accompanying drawings illustrative thereof wherein:

FIG. 1 is a top plan view of the holder;

FIG. 2 is a side elevation view of the holder;

FIG. 3 is a bottom view of the holder;

FIG. 4 is an isometric view of the holder;

FIG. 5 is a greatly enlarged sectional detail view taken upon the plane of the section line 5—5 in FIG. 3; and, FIG. 6 is an isometric view of a partially shown milling machine showing the holder positioned on the quill thereof, and with the holder holding a mist sprayer in operative relation to a milling tool.

DESCRIPTION OF THE PREFERRED EMBODIMENT

Referring now to the drawings wherein like numerals designate like parts throughout the various views, the reference numeral 10 designates the holder of the invention generally. The holder 10 comprises a body 12 of resilient material, and is preferably of an injection moldable resin, such as glass filled nylon. The body 12 is of a C-shape defining a central opening 14 bounded by an interior wall 16 that is generally conformable to a right circular cylinder.

The opening 14 has an entrance 18 such that the clamping arms 20 and 22 defining the C-shape subtend an angle substantially greater than 180 degrees as clearly shown in FIGS. 1 and 3 to be about 245 degrees. The clamping arms 20 and 22 are mirror images of each other and indeed the entire holder 10 is symmetrical about the axis of opening 14. The free ends of the clamping arms 20 and 22 are smoothly rounded as indicated at 24 and 26, respectively.

The body 12 has an integral radially extending support arm 28 that is positioned in diametric opposition to the entrance 18, and the end portion 30 of the support arm 28 is enlarged as shown and provided with a circular opening or aperature 32 therethrough that is parallel to the axis of the opening 14.

For the purpose of enhancing resilient flexibility of the holder 10 and particularly of the clamping arms 20 and 22, the arms 20 and 22 are provided with diametrically opposed internal recesses 34 and 36, respectively, and an internal recess 38 is provided at their juncture.

The recesses 34, 36 and 38 subdivide the inner wall into four gripping sections 40, 42, 44 and 46 that enable a better fit or accommodation to frictionally grip the cylindrical surface 46 of the quill 48 of a milling machine such as partially shown at 50.

In the interest of conserving material and reducing weight while improving the resilient flexibility of the holder 10, the undersides of the gripping sections 40–42 are concaved or grooved as shown at 52, and pitted as shown at 54 adjacent the recesses 34–38.

In the preferred construction, the entrance width is of a width from 30% to 70% of the diameter of the opening 14, and the body 12 has an axial thickness of 15% to 30% of such diameter. The radial extent of the body 12 about the opening 14 is 15% to 35% of the diameter of the opening 14.

It will be noted that the holder has a plane of symmetry that is coincident with the axis of the opening 14.

As will be readily appreciated by those familiar with the art, the holder 10 is especially suited for use with Bridgeport type mills.

In use, the holder 10 is passed over the spindle 56 or a tool 58 of the machine 50 below the quill 48, it being noted that the width of the entrance 18 freely accommodates such passage. The holder 10 is axially aligned with the quill 48 and then with a slight wobbling motion pressed or forced upwardly to obtain entrance of the lower end of the quill 48 into the holder opening 14. The holder 10 frictionally grips the quill 48 snugly so as to resist movement thereon; however the user can overpower such resistance and move the holder 10 to any height and angular position desired on the quill 48.

Either prior to or after positioning the holder 10 as described above, the shank 60 of an accessory item such as a mist sprayer 62 is frictionally forced into and adjusted in the opening 32 so that a desired operational relationship to the tool 58 is obtained.

Many other types of items can be held by the holder 10, such as lamps, etc.

Having now fully described the invention as to its use, structure and fabrication, attention is now directed to the appended claims in order to ascertain the actual scope of the invention.

I claim:

1. An accessory item holder for use with milling machines, said holder comprising a C-shaped body of resilient material defining an opening having an internal wall bounding said opening that is generally conformable to more than 180 degrees of the circular extent of a right circular cylinder, said opening having an entrance of a width that is from about 30% to about 70% of the diameter of the opening, said body having an axial thickness of from about 15% to about 30% of the diameter of the opening, and the body having a radial extent about the opening of about 15% to about 35% of the diameter of the opening, and said body having an integral radially extending support arm at a position that is spaced angularly from the entrance, said arm being provided adjacent its extremity with an aperture therethrough that is adapted to accept therethrough shanks of accessory items.

2. The combination of claim 1, wherein said internal wall is provided with a plurality of circumferentially spaced recesses that subdivide and separate the surface of said wall into a plurality of circumferentially spaced quill gripping sections of substantially greater circumferential extents than those of the recesses.

3. The combination of claim 1, wherein the holder defines a pair of clamping arms on opposite sides of the opening, and wherein said internal wall is provided with a plurality of circumferentially spaced recesses that subdivide and separate the surface of said wall into a plurality of circumferentially spaced quill gripping sections of substantially greater circumferential extents than those of the recesses, and wherein said arms are circumferentially coincident with more than one-half of the total circumferential extent of the gripping sections.

4. The combination of claim 1, wherein the support arm is diametrically opposed to the entrance, and wherein said internal wall is provided with a plurality of circumferentially spaced recesses that subdivide and separate the surface of said wall into a plurality of circumferentially spaced quill gripping sections of substantially greater circumferential extents than those of the recesses.

* * * * *